United States Patent Office 3,205,254
Patented Sept. 7, 1965

3,205,254
S-AROMATIC ESTERS OF CHLOROMETHYL-PHOSPHONODITHIOIC ACIDS
Ralph B. Fearing, Hammond, Ind., Edward N. Walsh, Chicago Heights, Ill., and John Bruce McBain, Campbell, Calif., assignors to Stauffer Chemical Company, New York, N.Y., a corporation of Delaware
No Drawing. Filed Mar. 2, 1964, Ser. No. 348,819
5 Claims. (Cl. 260—461)

This application is a continuation-in-part of our copending application, U.S. Serial No. 172,890, filed February 13, 1962, now abandoned.

This invention is directed to certain novel phosphorus-containing compounds, a process for preparing said compounds, and their method of use as pest control agents.

The novel compounds of the invention are the aromatic thio ester derivatives of phosphonothiolothionic acid and may be represented by the formula:

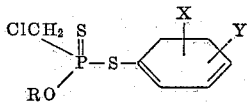

wherein R is a member selected from normal propyl and isopropyl and X and Y are members selected from hydrogen, halo and nitro, but X and Y are not both hydrogen. Among the suitable substituted phenyl radicals are 3,4-dichlorophenyl, 4-nitrophenyl, 2-chloro-4-bromophenyl, 2-nitro-4-chlorophenyl, and the like.

The compounds of the invention are effective for controlling aphids, mites, Lepidoptera, fungi, and insects of economically significant orders. Surprisingly, their general pesticidal activity, and in particular their activity towards Lepidoptera, is extremely high although they exhibit a relatively low mammalian toxicity. It is even more surprising that the propyl esters of the invention are more effective against Lepidoptera than the methyl and ethyl homologs, since it is generally known in the art of other phosphorus-containing pesticides that the methyl and ethyl esters furnish higher activity, see, e.g., Chemical Week, May 25, 1963, pp. 118–147. Where used herein the term "pest" is intended to the restricted sense generally recognized in the art as applying to the lower forms of life customarily controlled by chemical means and excluding the higher animals, the vertebrates, e.g., rodents, birds, and larger forms which are more commonly controlled by mechanical means such as traps. It will be apparent to one skilled in the art that the toxic activity of the new compounds with various pest species is indicative of activity with species and orders not shown.

The over-all reaction for preparing the compounds of the invention may be expressed by the following equation:

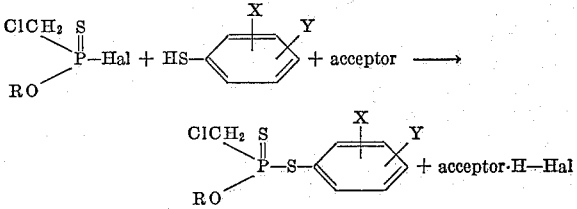

wherein R, X, and Y are as defined above, "Hal" is halogen, preferably chlorine, and "acceptor" is a hydrogen halide acceptor such as triethylamine and the like. Reaction is preferably carried out in the presence of an organic solvent such as benzene, dioxane, toluene, xylene, and the like. The hydrogen halide acceptor serves to bind the halogen acid, generated as a side product of the main reaction, and prevent its reaction with the phosphonate product. The reaction is preferably carried out at temperatures between about 30° C. and 65° C. Under the preferred reaction conditions using an organic solvent and hydrogen halide acceptor, the new compounds of the invention may be efficiently prepared in yields of from about 85% to 98% of theoretical.

The following specific examples illustrate the method of preparing the novel compounds but should not be construed as unduly limiting the broader aspects of the invention.

EXAMPLE 1

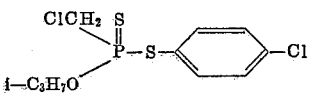

Fifty cc. of benzene, 31.2 grams of O-isopropyl chloromethylphosphonochloridothioate and 22.0 grams of p-chlorophenyl mercaptan were placed in a reaction flask and a solution of 15.4 grams of triethylamine in benzene was slowly added while maintaining the temperature at 30° C. Following the addition of triethylamine, the contents of the flask were heated at 40°–42° for 40 minutes. The product was then washed, concentrated and filtered to yield 42.2 grams (89% of theoretical) of O-isopropyl-S-(4-chlorophenyl) chloromethylphosphonodithioate having an index of refraction $N_D^{25}=1.5955$. Elemental analysis of the product showed 9.9% P, 20.7% S, and 22.2% Cl compared to the theoretical calculated values of 9.83% P, 20.35% S, and 22.5% Cl.

Using a procedure substantially in accordance with that described above, the following specific compounds were prepared:

EXAMPLE 2

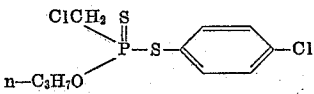

O-(n - propyl)-S-(4-chlorophenyl) chloromethylphosphonodithioate; $N_D^{25}=1.6000$; yield=95% of theory. Analysis.—Found: 9.6% P, 20.4% S, and 21.5% Cl. Theory: 9.85% P, 20.3% S, and 22.5% Cl.

EXAMPLE 3

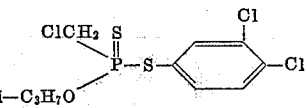

O-isopropyl-S-(3,4-dichlorophenyl)-chloromethylphosphonodithioate; $N_D^{25}=1.6000$; yield=83% of theory. Analysis.—Found: 8.9% P, 17.2% S, and 28.3% Cl. Theory: 8.8% P, 18.3% S, and 30.5% Cl.

EXAMPLE 4

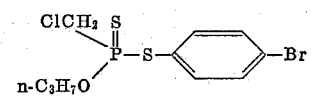

O-(n - propyl)-S-(4-bromophenyl)-chloromethylphosphonodithioate; $N_D^{25}=1.6130$; yield=95% of theory. Analysis.— Found: 8.75% P, 18.1% S, and 5.33 me. of total halogen/g. of product. Theory: 8.6% P, 17.8% S, and 5.56 me. of total halogen/g. of product.

EXAMPLE 5

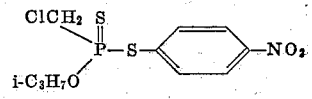

O - isopropyl - S-(4-nitrophenyl) - chloromethylphosphonodithioate; $N_D^{25}=1.5930$; yield=62% of theory. Analysis.—Found: 10.5% P, 20.5% S, 12.2% Cl, and 4.8% N. Theory: 9.5% P, 19.7% S, 10.9% Cl, and 4.3% N.

EXAMPLE 6

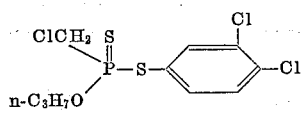

O-(n-propyl)-S-(3,4 - dichlorophenyl) - chloromethylphosphonodithioate; $N_D^{25}=1.6035$; yield=97% of theory. *Analysis.*—Found: 8.7% P, 16.4% S, and 28.7% Cl. Theory: 8.8% P, 18.34% S, and 30.5% Cl.

EXAMPLE 7

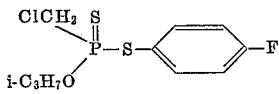

O-isopropyl-S-(4 - fluorophenyl) - chloromethylphosphonodithioate; $N_D^{25}=1.5725$; yield=100% of theory. *Analysis.*—Found: 10.1% P, 21.0% S, 13.1% Cl, and 6.9% F. Theory: 10.36% P, 21.4% S, 11.9% Cl, and 6.36% F.

Pesticidal activity for the compounds of the foregoing examples is illustrated in Table I wherein the percentage kill among a group of pest species is reported for a specified quantity of toxicant expressed in micrograms (herein termed the bioassay test) or for a percentage concentration of toxicant in aqueous dispersion (herein termed the screening test). A slanted line is used to separate the percentage kill among the pest species, shown on the left, and the percentage concentration or total quantity of toxicant, shown on the right.

In the table the various pest species are assigned the following numbers:

1. House fly—*Musca domestica* (Linn.)
2. American cockroach—*Periplaneta americana* (Linn.)
3. Spotted milkweed bug—*Oncopeltus fasciatus* (Dallas)
4. Confused flour beetle—*Tribolium confusam* (Duvol)
5. Two-spotted mite—*Tetranchus telarius* (Linn.)
6. Salt-marsh caterpillar—*Estigmene acraea* (Drury)
7. Pea aphid—*Macrosiphum pisi* (Harris)

*Table I*
PESTICIDAL ACTIVITY

| Compound (Example Number) | 1 | 2 | 3 | 4 | (Post Embryonic) 5 | (Embryonic) 5 | 6 | 7 |
|---|---|---|---|---|---|---|---|---|
| 1 | 100/10 μg. | 100/0.05 Percent | 100/0.05 Percent | 100/10 μg. | 80/0.005 Percent | 100/0.05 Percent | 70/0.0005 Percent | 100/0.01 Percent |
| 2 | 92/10 | 60/0.1 | 80/0.1 | 100/50 | | | 100/0.005 | |
| 3 | 100/50 | 100/0.1 | 100/0.1 | 100/50 | | | 100/0.1 | |
| 4 | 100/50 | 80/0.1 | 10/0.05 | 100/50 | | | 100/0.1 | |
| 5 | 100/50 | | | | | | 100/0.05 | 100/0.01 |
| 6 | [1]100/0.1 | | | | | | | |
| 7 | 88/10 | 100/0.1 | | | 100/0.05 | | 100/0.005 | |

[1] Percent.

In the screening tests for pest species numbered 1 to 4 above, from ten to twenty-five insects were caged in cardboard mailing tubes 3⅛ inches in diameter and 2⅝ inches tall. The cages were supplied with cellophane bottoms and screened tops. Food and water were supplied to each cage, except in the case of the confused flour beetle which was primarily tested to determine fumigant action. Dispersions of the test compounds were prepared by dissolving one half gram of the toxic material in ten ml. of acetone. This solution was then diluted with water containing 0.015% Vatsol (a sulfonate-type wetting agent) and 0.005% methocel (methyl cellulose) as emulsifiers, the amount of water being sufficient to dilute the active ingredient to a concentration of 0.1% or below. The test insects were then sprayed with this dispersion. After twenty-four and seventy-two hours, counts were made to determine living and dead insects.

Compounds which showed high mortality of house flies in the screening test were bioassayed on *M. domestica*. In this test, a known quantity of the toxicant was placed in a confined area. For the fly bioassay, the same cages were employed as for the screening tests. A weighed amount of the toxicant was placed in a 60 mm. diameter petri dish along with 1 ml. of acetone containing light spray oil. After the solution air dried, a cage containing twenty-five female flies was placed over the residue. Counts of living and dead insects were made after twenty-four and seventy-two hours.

Essentially the same procedure was followed in the confused flour beetle bioassay as in the house fly bioassay. For this test, however, twenty adult beetles were used. Mortality was checked at twenty-four and forty-eight hours.

The miticidal screening test for species number 5 above involved using young pinto bean plants in the primary leaf stage as host plants for the mites. The bean plants were infested with several hundred mites and then sprayed to run-off with an aqueous test dispersion prepared as described above. Sprayed plants were transferred to a greenhouse and held for fourteen days. The miticidal and ovicidal activity of the test compounds were determined after seven and fourteen days.

For Lepidoptera evaluation, the test organism used was the salt-marsh caterpillar, species number 6 above, a representative member of an order containing a large number of economically important plant pests. Test dispersions of various concentrations were prepared by adding the active material to stock solutions of water containing wetting agents by the procedure outlined heretofore. Dock leaves approximately five inches long were dipped in these dispersions for ten seconds. The leaves were then allowed to dry. A filter paper disk was placed in a one pound food container and moistened with one ml. of water. The dried dock leaves were then introduced into the container together with five third instar salt-marsh larvae. A petri dish cover was used for observation. The tests were conducted for forty-eight hours. After twenty-four hours a fresh, undipped dock leaf was placed in the container. Mortality readings were taken at twenty-four and forty-eight hours.

The compounds of Examples 1 and 5 were also evaluated on heteroptera, specifically the pea aphid, *Macrosiphum pisi*. In this test young broad bean plants were sprayed with dispersions of the candidate pesticides until run-off occurred. A solution concentration of 0.05% toxicant was used for the initial evaluation. Candidates which showed high mortality by the initial test were then tested at lower concentrations. The bean plants were allowed to dry before infesting them with three to four day old aphids. The aphids were confined to definite areas of the plants by means of small cages which were fastened directly to the leaves. Two cages containing five aphids each were used per plant. Mortality observations were made seventy-two hours after initiation of the test.

Although the above tests were accomplished with aqueous dispersions, the toxic compounds may also be used in the form of aqueous solutions, when appreciably soluble, non-aqueous solutions, wettable powders, vapors, and dusts as may be best suited to the conditions of use.

We claim:
1. A compound having the formula:

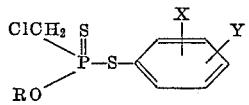

where:
R is selected from the group consisting of normal propyl and isopropyl and X and Y are selected from the group consisting of hydrogen, halo and nitro, but X and Y are not both hydrogen.

2. O - isopropyl - S - (4 - chlorophenyl) chloromethylphosphonodithioate.
3. O - (n-propyl) - S - (4-chlorophenyl) chloromethylphosphonodithioate.
4. O - isopropyl - S - (4 - nitrophenyl) chloromethylphosphonodithioate.
5. O - isopropyl - S - (4 - fluorophenyl) chloromethylphosphonodithioate.

References Cited by the Examiner

UNITED STATES PATENTS 2,910,402  10/59  Fairchild _____ 260—461

FOREIGN PATENTS 600,019  5/61  Belgium.

CHARLES B. PARKER, *Primary Examiner.*